United States Patent
Wu

(10) Patent No.: US 11,315,365 B2
(45) Date of Patent: Apr. 26, 2022

(54) METHOD FOR REGISTERING FINGERPRINT, TERMINAL AND COMPUTER-READABLE STORAGE MEDIUM

(71) Applicant: Shenzhen Goodix Technology Co., Ltd., Shenzhen (CN)

(72) Inventor: Dongcheng Wu, Shenzhen (CN)

(73) Assignee: Shenzhen Goodix Technology Co., Ltd., Shenzhen (CN)

(*) Notice: Subject to any disclaimer, the term of this patent is extended or adjusted under 35 U.S.C. 154(b) by 0 days.

(21) Appl. No.: 16/903,276

(22) Filed: Jun. 16, 2020

(65) Prior Publication Data
US 2020/0311451 A1 Oct. 1, 2020

Related U.S. Application Data

(63) Continuation of application No. PCT/CN2018/119208, filed on Dec. 4, 2018.

(51) Int. Cl.
G06K 9/36 (2006.01)
G06V 40/50 (2022.01)
G06V 40/13 (2022.01)

(52) U.S. Cl.
CPC ............. *G06V 40/50* (2022.01); *G06V 40/13* (2022.01)

(58) Field of Classification Search
CPC ......... G06K 9/00926; G06K 9/00006–9/0012; G06K 9/00026; G06V 40/50; G06V 40/12–40/1382
See application file for complete search history.

(56) References Cited

U.S. PATENT DOCUMENTS

| | | | | |
|---|---|---|---|---|
| 7,751,595 | B2* | 7/2010 | Russo | G06Q 10/02 382/115 |
| 10,528,791 | B1* | 1/2020 | Shanmuga Vadivel | G06K 9/0002 |
| 2014/0003677 | A1* | 1/2014 | Han | G06K 9/00912 382/124 |
| 2016/0147825 | A1* | 5/2016 | Chiang | G06K 9/00087 707/728 |
| 2018/0144176 | A1* | 5/2018 | Ji | G06K 9/00926 |

FOREIGN PATENT DOCUMENTS

| | | |
|---|---|---|
| CN | 105373786 A | 2/2016 |
| CN | 105814585 A | 7/2016 |
| CN | 105893814 A | 8/2016 |
| CN | 106233306 A | 12/2016 |
| CN | 106575355 A | 4/2017 |

OTHER PUBLICATIONS

Shenzhen Goodix Technology Co., International Search Report, PCT/CN2018/119208, dated Aug. 30, 2019, 5 pgs.

* cited by examiner

*Primary Examiner* — Brian Werner
(74) *Attorney, Agent, or Firm* — USCH Law, PC

(57) ABSTRACT

Some embodiments of the present application provide a method for registering a fingerprint, a terminal, and a computer readable storage medium. The method for registering a fingerprint includes: acquiring fingerprint images collected in response to a user sliding a finger; filtering the fingerprint images to select filtered images that satisfy a preset filtering condition; and registering the filtered images into a fingerprint template. Thus, the user can register the fingerprint by sliding the finger, without pressing a number of times, which improves user experience and helps to enhance identification performance.

10 Claims, 6 Drawing Sheets

METHOD FOR REGISTERING FINGERPRINT, TERMINAL AND COMPUTER-READABLE STORAGE MEDIUM

CROSS-REFERENCE TO RELATED APPLICATIONS

This application is a continuation of PCT Application No. PCT/CN2018/119208, filed on Dec. 4, 2018, which is hereby incorporated by reference in its entirety.

TECHNICAL FIELD

The present disclosure relates to fingerprint identification technology, and more particularly, to a method for registering a fingerprint, a terminal, and a non-transitory computer-readable storage medium.

BACKGROUND

With the development of fingerprint identification technology, more and more mobile terminals such as smart phones use fingerprint identification function, making it more convenient for people to use them.

The inventors of the present application found that existing technologies have at least the following problems: fingerprint chips are getting smaller and smaller in size to satisfy a growing demand of mobile terminals such as smart phones, so in order to ensure fingerprint unlocking performance, a user needs to press the home button or a designated area of the smart phone many times during registration, resulting in poor user experience. In addition, as storage space for template in a mobile terminal is limited, not all of the collected registration data can be saved into the template, causing degradation in user identification experience.

SUMMARY

Some embodiments of the present disclosure provide a method for registering a fingerprint, a terminal, and a non-transitory computer-readable storage medium, so that a user can register a fingerprint by sliding a finger without pressing a number of times, which improves user experience and helps to improve identification performance.

An embodiment of the present disclosure provides a method for registering a fingerprint at a mobile terminal, the mobile terminal includes at least one processor, and the method includes: acquiring fingerprint images collected in response to a user sliding a finger over a fingerprint identification area of the mobile terminal; filtering the acquired fingerprint images to select filtered images that satisfy a preset filtering condition; and registering the filtered images into a fingerprint template of the mobile terminal.

An embodiment of the present disclosure further provides a terminal, which includes: at least one processor; and a memory connected and in communication with the at least one processor, where the memory stores instructions executable by the at least one processor, and the instructions when executed by the at least one processor cause the at least one processor to perform the method for registering a fingerprint as described above.

An embodiment of the present disclosure further provides a non-transitory computer-readable storage medium storing a computer program. The computer program when executed by a processor cause the processor to perform the method for registering a fingerprint described above.

Compared with existing technologies, fingerprint images are collected in response to a user sliding a finger over a fingerprint identification area of the mobile terminal in embodiments of the present disclosure, and without need for the user to press a designated area of the smart phone a number of times. A certain number of fingerprint images may be collected when the user slides a finger only once, which improves the user experience and increases speed of registration. The fingerprint images collected in response to the user sliding a finger are filtered, and the fingerprint images that satisfy the preset filtering condition are registered into the fingerprint template of the mobile terminal. Since the collected fingerprint images are filtered, a validity of the fingerprint images stored in the registration template is improved, and an amount of valid information in the registration template is greatly increased. At the same time, since the fingerprint images that do not satisfy the preset filtering condition in response to the user sliding a finger are not registered, there are more storage space to register the fingerprint images that satisfy the preset filtering condition into the fingerprint template of the mobile terminal, which is beneficial to improving an accuracy of fingerprint identification and further enhancing the identification experience.

In some embodiments, the fingerprint images includes a number of sets of images corresponding, respectively, to the user sliding the finger over the fingerprint identification area a number of times, each set of images being collected in response to the user sliding the finger once over the fingerprint identification area; filtering the fingerprint images to select filtered images that satisfy the preset filtering condition includes: filtering each set of images after it is collected to select a corresponding set of filtered images that satisfy the preset filtering condition; registering the filtered images into the fingerprint template includes: registering each set of filtered images into the fingerprint template. Sliding the finger for a number of times is beneficial to collecting multi-directional, multi-angle, and a large number of fingerprint images, and registering the fingerprint images that satisfy the filtering condition and that are collected in response to the user sliding the finger for a number of times into the fingerprint template is beneficial to increasing the number of fingerprint images that satisfy the preset filtering condition in the fingerprint template, thereby facilitating an accurate matching when the fingerprint identification is performed.

In some embodiments, the method further includes, after registering the fingerprint images that satisfy the preset filtering condition into the fingerprint template: determining whether the number of times has reached a preset number of times, and sending a prompt message to prompt the user to continue sliding the finger if the preset number of times is not reached. Prompting the user to continue sliding the finger if the number of times is less than the preset number of times is beneficial to collecting a sufficient number of fingerprint images, which is conducive to providing more valuable matching criteria for subsequent fingerprint identification.

In some embodiments, the prompt message includes at least: a first area across which the user should slide the finger again, where the first area is different from a second area across which the user slid the finger previously, which is beneficial to collecting fingerprint images that are not repeated with those collected in response to the user sliding the finger previously, and improving a validity of sliding.

In some embodiments, the method further includes, before filtering the fingerprint images to select filtered images that satisfy the preset filtering condition: determining whether a preset requirement is satisfied by the user sliding the finger over the fingerprint identification area, where the preset requirement includes: an overlap area of an area across which sliding of the finger is performed at a first time and an area across which sliding of the finger is performed at a second time prior to the first time is smaller than a preset area. The fingerprint images are filtered to select filtered images that satisfy the preset filtering condition in response to the preset requirement being satisfied, or the fingerprint images in response to the preset requirement not being satisfied are discarded, which is beneficial to recording the number of times the user slides a finger validly, to performing a valid filtering, to discarding the fingerprint images that are collected in response to the user sliding the finger and that does not satisfy the preset requirement, and also helpful to avoid unnecessary filtering.

In some embodiments, registering the filtered images into the fingerprint template includes: detecting whether the fingerprint template includes a first fingerprint image that satisfies the preset condition; deleting the first fingerprint image and registering a second fingerprint image into the fingerprint template if the first fingerprint image satisfies the preset condition, where the second fingerprint image is one of the filtered images that satisfies the preset filtering condition, which is conducive to dynamically adjusting the fingerprint images already registered into the fingerprint template when a new fingerprint image is registered into the fingerprint template to ensure that the fingerprint template has a sufficient space to register new fingerprint images.

In some embodiments, the preset condition includes: an overlap area of the first fingerprint image and the second fingerprint image is greater than a preset threshold value and an image quality of the second fingerprint image exceeds that of the first fingerprint image, which is conducive to ensuring that the fingerprint image registered into the fingerprint template are constantly replaced with fingerprint images with better image quality, so as to ensure an overall image quality of the fingerprint images registered into the fingerprint template.

In some embodiments, the method further includes, before detecting whether the fingerprint template includes the first fingerprint image that satisfies the preset condition: detecting whether a storage space for storing the fingerprint template is full. In other words, if a storage space for storing the fingerprint template is full, dynamic adjustment for the fingerprint images registered into the fingerprint template is helpful to improve an validity of dynamic adjustment, so that fingerprint images with better quality may be registered into the fingerprint template through dynamic adjustment even if the registration space is full.

In some embodiments, if the storage space is full and the fingerprint template does not include a fingerprint image that satisfies the preset condition, an invalid fingerprint image is deleted and the second fingerprint image is registered into the fingerprint template, where the invalid fingerprint image is a fingerprint image with the least valid fingerprint information among registered fingerprint images in the fingerprint template, which provides a sufficient storage space for the fingerprint images to be registered.

In some embodiments, filtering the fingerprint images includes: determining an image quality and an image area of a fingerprint image of a current frame, and calculating an overlap rate between the fingerprint image of the current frame and a fingerprint image of a previous frame if the image quality of the fingerprint image of the current frame satisfies a preset quality standard and the image area of the fingerprint image of the current frame satisfies a preset area standard, and taking the fingerprint image of the current frame as the filtered fingerprint image satisfying the filtering condition if the overlap rate is less than a preset threshold overlap rate value. Filtering the several frames of fingerprint images collected in response to the user sliding a finger according to the image quality and the image area is beneficial to acquiring fingerprint images that are more favorable for fingerprint identification. The fingerprint images that satisfy the quality standard and area standard are then filtered according to the overlap rate, which is beneficial to eliminating fingerprint images with a large overlap rate, reducing the overlap rate of the filtered fingerprint images that satisfy the quality standard and the area standard, and reducing an occupation of the storage space for fingerprint templates to a certain extent which is helpful in registering more and more valid fingerprint images.

BRIEF DESCRIPTION OF THE DRAWINGS

One or more embodiments are described as examples with reference to corresponding figures in the accompanying drawings, and the examples do not constitute a limitation to the embodiments. Elements with the same reference numerals in the accompanying drawings represent similar elements. The figures in the accompanying drawings do not constitute a proportion limitation unless otherwise stated.

DETAILED DESCRIPTION

In order to make objectives, technical solutions and advantages of the present disclosure clearer, some embodiments of the present disclosure will be explained below in detail with reference to accompanying drawings and embodiments. It should be understood that specific embodiments described here only explain the disclosure but do not constitute a limitation to the disclosure. The following embodiments are divided for convenience of description, and should not constitute any limitation on the specific implementation of the present disclosure. The various embodiments may be combined with each other and referred to each other on the premise of no contradiction.

A first embodiment of the present disclosure relates to a method for registering a fingerprint at a mobile terminal, the mobile terminal includes at least one processor, and the method includes: acquiring fingerprint images collected in response to a user sliding a finger over a fingerprint identification area of the mobile terminal; filtering the fingerprint images to select filtered images that satisfy the preset filtering condition; and registering the filtered images into the fingerprint template of the mobile terminal. Implementation details of a method for registering a fingerprint of this embodiment are described in detail below. The following content is only used for easy understanding of the implementation details provided, and is not a must for implementing this solution.

Figure 1:
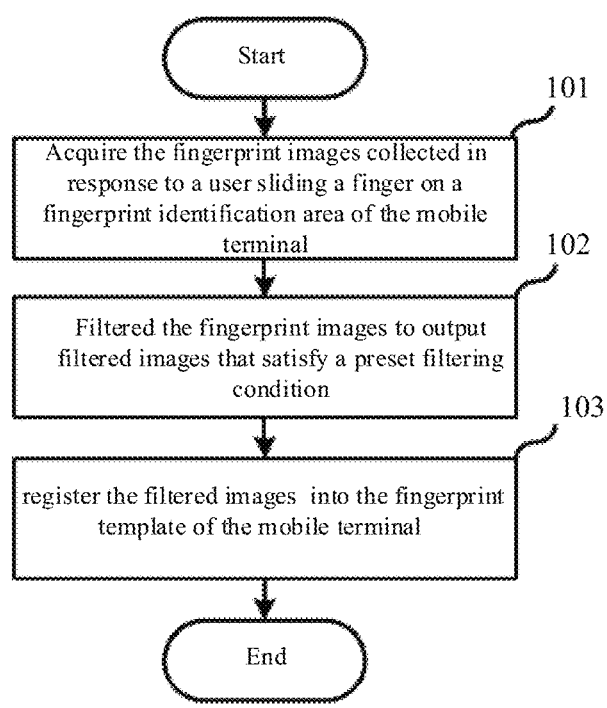
FIG. 1 is a flowchart of a method for registering a fingerprint according to a first embodiment of the present disclosure.

The method for registering a fingerprint in this embodiment can be applied to mobile terminals with fingerprint identification function, such as a smart phone or a tablet computer. A flowchart of the method for registering a fingerprint in this embodiment may be shown in FIG. 1 and includes the following steps:

In step 101, the fingerprint images collected in response to a user sliding a finger over a fingerprint identification area of the mobile terminal are acquired.

Specifically, in response to a user sliding a finger over a fingerprint identification area of a mobile terminal, a built-in fingerprint sensor of the mobile terminal can collect a number of frames of fingerprint images. Specifically, the fingerprint sensor can start to collect fingerprint images after detecting a finger press at one position on the fingerprint identification area, and continuously collect fingerprint images as the finger slide across the fingerprint identification area until detecting that the finger is lifted at another position on the fingerprint identification area.

In step 102, the fingerprint images are filtered to select filtered images that satisfy a preset filtering condition.

Figure 2:
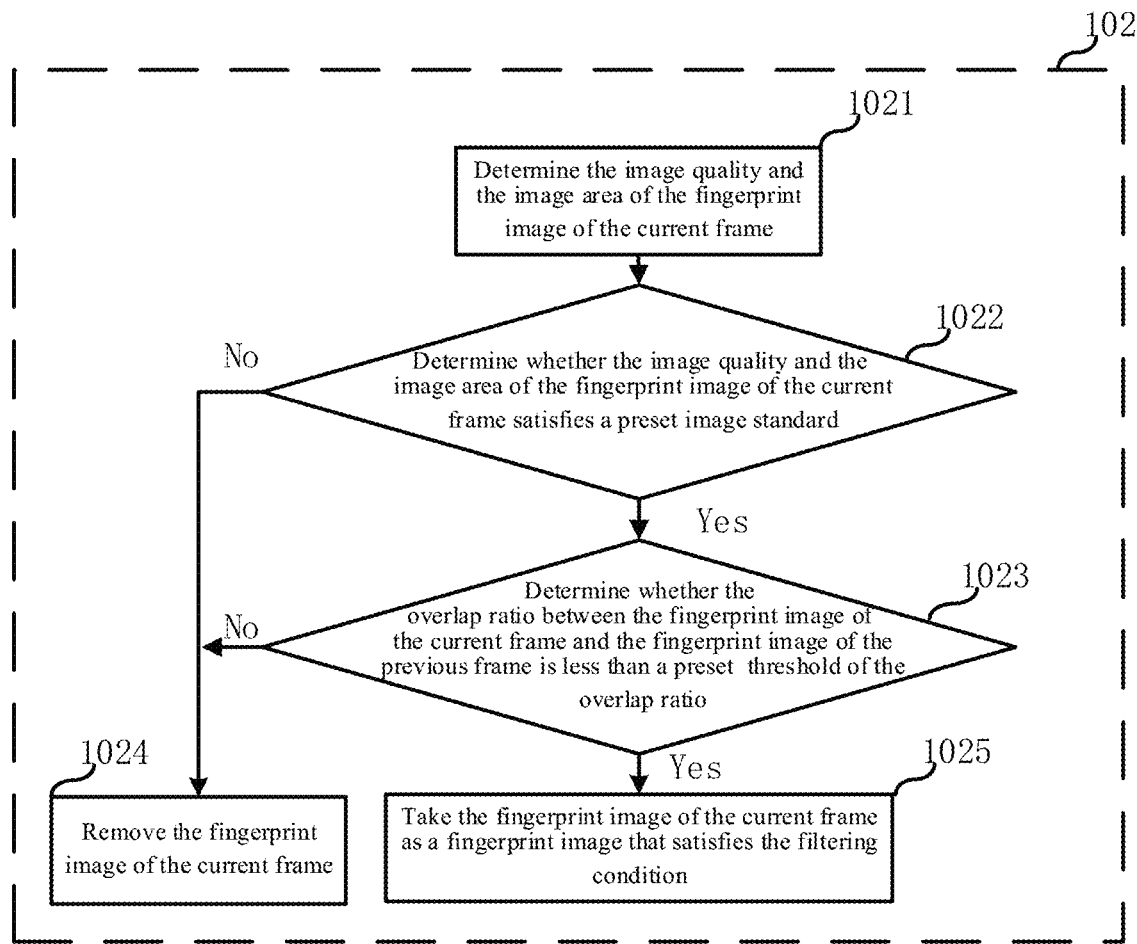
FIG. 2 is a schematic diagram of removing the fingerprint image with a large overlap area according to the method for registering a fingerprint in the first embodiment of the present disclosure.

Specifically, the filtering can be performed according to an image quality and an image area of each frame of fingerprint image collected in response to a user sliding the finger, and an overlap area of each two frames of fingerprint image collected in response to a user sliding the finger. For example, all the fingerprint images are collected in response to a user sliding the finger once, and then all the fingerprint images are filtered, or a specified number of fingerprint images are collected and then filtered, then continue the collection in response to a user sliding the finger once. In the following FIG. 2, after all the fingerprint images are collected, the fingerprint images are filtered, which is taken as an example for detailed description, but does not constitute a limitation in practical applications.

In step 1021, the image quality and the image area of the fingerprint image of the current frame are determined.

Specifically, the image quality of fingerprint images can be measured according to parameters such as a sharpness of the collected fingerprint image, a gray-level distribution of the collected fingerprint image, and a characteristic point distribution of the collected fingerprint image, and determined by using any appropriate calculation algorithm for image quality. A fingerprint area of the fingerprint image can be determined by using any appropriate area calculation algorithm after the fingerprint image is acquired, which is not limited in this embodiment. It should be noted that, in this embodiment, the image quality and the image area are only used as filtering criteria for fingerprint images. In practical applications, it is not limited to the above two filtering criteria. Those skilled in the art may also add other criteria for filtering fingerprint images according to actual conditions.

In step 1022, whether the image quality and the image area of the fingerprint image of the current frame satisfy the preset image standard is determined. If yes, step 1023 is performed, otherwise step 1024 is performed.

Specifically, the preset image standard may include a preset image quality standard and a preset image area standard. The preset image standard may be set by those skilled in the art according to actual needs, for example, a certain threshold value for the sharpness, a threshold value for the size of an image area, and the like may be set, which is not limited in this embodiment. If the fingerprint image of the current frame satisfies the preset image standard, step 1023 is performed; otherwise step 1024 is performed.

In step 1023, whether an overlap rate of the fingerprint image of the current frame and the fingerprint image of the previous frame is less than a preset threshold overlap rate value is determined. If yes, step 1025 is performed, otherwise step 1024 is performed.

Specifically, the preset threshold overlap rate value may be set by those skilled in the art according to needs, and is intended to retain one fingerprint image among several frames of fingerprint images with a large overlap rate. For example, referring to FIG. 3, the fingerprint image of the current frame is the fingerprint image 2 with the dotted frame. It can be seen from the figure that the overlap rate of the fingerprint image 2 and the fingerprint image 1 is large. The overlap rate of the fingerprint image of the current frame and the fingerprint image of the previous frame may be considered to be greater than the preset threshold overlap rate value, and then step 1024 is performed; otherwise, step 1025 is performed.

It should be noted that the fingerprint image is not limited to comparing with the fingerprint image of the previous frame, and may be compared with the fingerprint image of any frame previously collected in this embodiment.

In step 1024, the fingerprint image of the current frame is removed.

Figure 3:
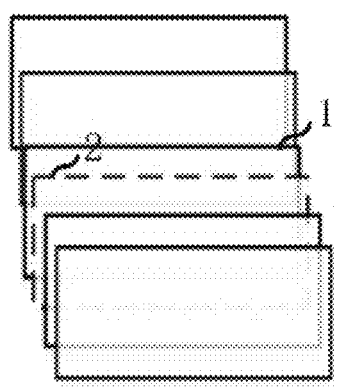
FIG. 3 is a flowchart of a specific implementation process of step 102 in the method for registering a fingerprint according to the first embodiment of the present disclosure.

In other words, if the fingerprint image of the current frame does not satisfy the preset image standard or does not satisfy a preset overlap rate standard, the fingerprint image of the current frame is removed. For example, as shown in FIG. 3, the fingerprint image of the current frame, that is, the fingerprint image 2 may be removed.

In step 1025, the fingerprint image of the current frame is taken as a fingerprint image that satisfies the preset filtering condition.

Specifically, after determining the image quality, the image area and the image of several frames of fingerprint images collected in response to the user sliding a finger, and an overlap rate of each two of several frames of the fingerprint images, the fingerprint images that satisfy the image quality standard, the image area standard, and the image overlap ratio standard may be taken as fingerprint images that satisfy the preset filtering condition.

In step 103, the filtered images are registered into the fingerprint template of the mobile terminal.

Specifically, after the fingerprint images are filtered, the fingerprint images that satisfy the filtering condition are registered into the fingerprint template, that is, the fingerprint images that satisfy the filtering condition are stored into the fingerprint template. A number of fingerprint images that satisfy the filtering condition are stored into the fingerprint template and used for matching with samples collected in the subsequent fingerprint identification.

In addition, the terminal may provide different fingerprint templates for fingerprints of different fingers, and store the fingerprint templates of different fingers into different storage spaces to satisfy users' need to use different fingerprints for fingerprint identification.

Compared with existing technologies, a user is enabled to quickly register the fingerprint by sliding a finger in this embodiment, and since the collected fingerprint images are filtered, the validity of the fingerprint images stored in the fingerprint template is improved, which greatly increases an amount of valid information in the fingerprint template. At the same time, as the fingerprint images that do not satisfy the filtering condition and that are collected in response to the user sliding the finger are not registered, there are more storage space for the fingerprint template to register the fingerprint images that satisfy the filtering condition, which is conducive to improving an accuracy of fingerprint identification and further enhancing an identification experience.

Figure 4:
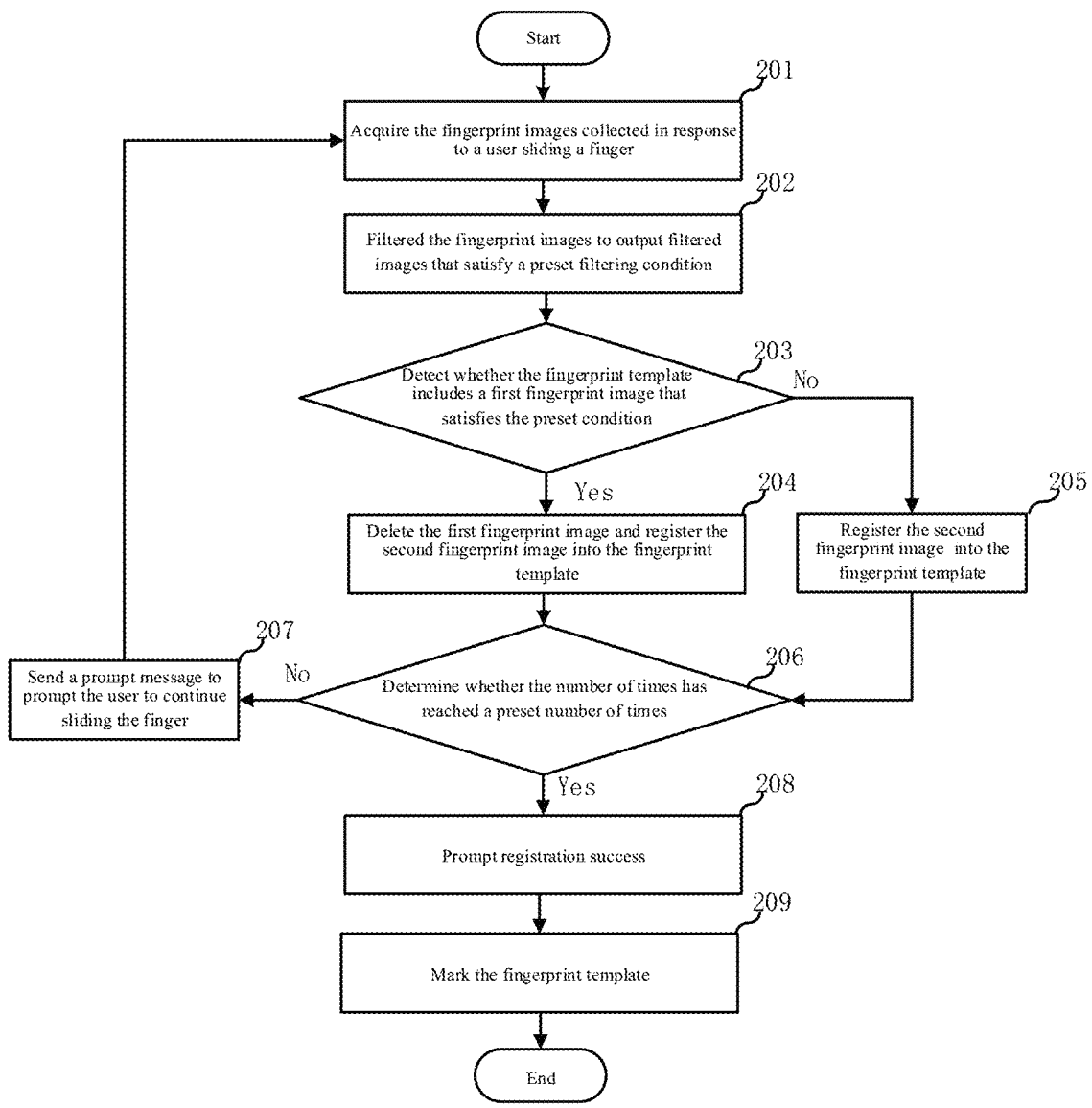
FIG. 4 is a flowchart of a method for registering a fingerprint according to a second embodiment of the present disclosure.

A second embodiment of the present disclosure relates to a method for registering a fingerprint. In this embodiment, the fingerprint images include a number of sets of images corresponding, respectively, to the user sliding the finger over the fingerprint identification area a number of times, each set of images being collected in response to the user sliding the finger once over the fingerprint identification area. The method for registering a fingerprint in this embodiment may be shown in FIG. 4 and includes the following steps:

In step 201, the fingerprint images collected in response to a user sliding a finger are acquired.

Specifically, since the user is required to slide the finger for a number of times in this embodiment, the fingerprint images include a number of sets of images corresponding, respectively, to the user sliding the finger over the fingerprint identification area a number of times, and each set of images is collected by the fingerprint sensor in response to the user sliding the finger once over the fingerprint identification area.

In step 202, the fingerprint images are filtered to select filtered images that satisfy a preset filtering condition.

Specifically, the fingerprint images may be filtered according to step 102 in the first embodiment. To avoid repetitions, details are not described herein again.

In step 203, whether the fingerprint template includes a first fingerprint image that satisfies the preset condition is detected. If yes, step 204 is performed, otherwise step 205 is performed.

Specifically, the preset condition may be: an overlap area of the first fingerprint image and the second fingerprint image is larger than a preset threshold value, and an image quality of the second fingerprint image exceeds that of the first fingerprint image, where the second fingerprint image may be one of the filtered images that satisfies the preset filtering condition, that is, the filtered fingerprint image to be registered, and the preset threshold value may be set by those skilled in the art according to actual needs. In other words, if the fingerprint template includes a fingerprint image that has a large overlap area with the fingerprint image to be registered, it may be considered that there is a first fingerprint image that satisfies the preset condition, and then step 204 is performed. If there is no first fingerprint image satisfying the preset condition, step 205 is performed.

In step 204, the first fingerprint image is deleted and the second fingerprint image is registered into the fingerprint template.

Specifically, this step may be understood as dynamically adjusting the fingerprint images stored in the fingerprint template and eliminating redundant data therein, so that there is enough storage space to register new fingerprint images. That is, the first fingerprint image with poor quality that has been registered in the fingerprint template is deleted and replaced with the second fingerprint image with good quality.

In step 205, the second fingerprint image is registered into the fingerprint template.

Specifically, if the fingerprint template does not include a first fingerprint image that satisfies the preset condition, it indicates that the fingerprint template does not include a fingerprint image of which the overlap area with the fingerprint image to be registered is greater than the preset threshold value. The second fingerprint image to be stored can be directly registered into the fingerprint template.

In step 206, whether the number of times has reached a preset number of times is determined. If yes, step 208 is performed, otherwise step 207 is performed.

Specifically, the preset number of times may be set by those skilled in the art according to actual needs, which is intended to obtain a sufficient number of fingerprint images by sliding the finger for the preset number of times. If the number of times has reached the preset number of times, step 208 is performed, otherwise step 207 is performed.

In step 207, a prompt message is sent to prompt the user to continue sliding the finger.

Specifically, the prompt message may include: a first area across which the user should slide the finger again. Preferably, the first area is different from a second area across which the user slid the finger previously. For example, if the user has slid a finger for 4 times, then the prompted sliding area of sliding the finger the fifth time may be not the same with each of the sliding areas of sliding the finger for the previous 4 times. Alternatively, in practical applications, the prompt information may also prompt the user to slide in a certain direction, for example, to prompt the user to slide in a different direction to collect fingerprint images, which is beneficial to obtaining more valid fingerprint images. After step 207 is performed, step 201 may be performed continually to obtain the fingerprint images collected in response to the user sliding the finger.

In step 208, a registration success is prompted.

Specifically, the user may be prompted that they have registered successfully through voice notification or screen display. However, in practical applications, it is not limited thereto, and any method for prompting a registration success is within the protection scope of this embodiment.

In step 209, the fingerprint template is marked.

Specifically, after registering the fingerprint by sliding a finger is successfully performed, marking the fingerprint template into which the fingerprint is registered by sliding a finger may be performed. In a subsequent process of fingerprint identification, when the fingerprint is identified by the user pressing the finger, the fingerprint registered into the fingerprint template by sliding a finger may be replaced with the collected fingerprint by pressing the finger if the collected fingerprint by pressing a finger and the fingerprint registered into the marked fingerprint template by sliding a finger match successfully. Since obtaining the fingerprint by pressing the finger is more in line with the user's habit of fingerprint unlocking, replacing the fingerprint registered into the fingerprint template by sliding the finger with the aforementioned collected fingerprint by pressing a finger is more beneficial to accuracy of fingerprint identification.

Compared with existing technologies, sliding the finger for a number of times in this embodiment is beneficial to collecting multi-directional, multi-angle, and a large number of fingerprint images, and registering the fingerprint images that satisfy the filtering condition and that are collected by sliding the finger for many times into the fingerprint template is beneficial to increasing the number of fingerprint images that satisfy the filtering condition in the fingerprint template, so as to facilitate more accurate matching in fingerprint identification. Prompting the user to continue sliding the finger if the number of times is less than the preset number is beneficial to collecting a sufficient number of fingerprint images, which is conducive to providing more valuable matching criteria for subsequent fingerprint identification.

Figure 5:
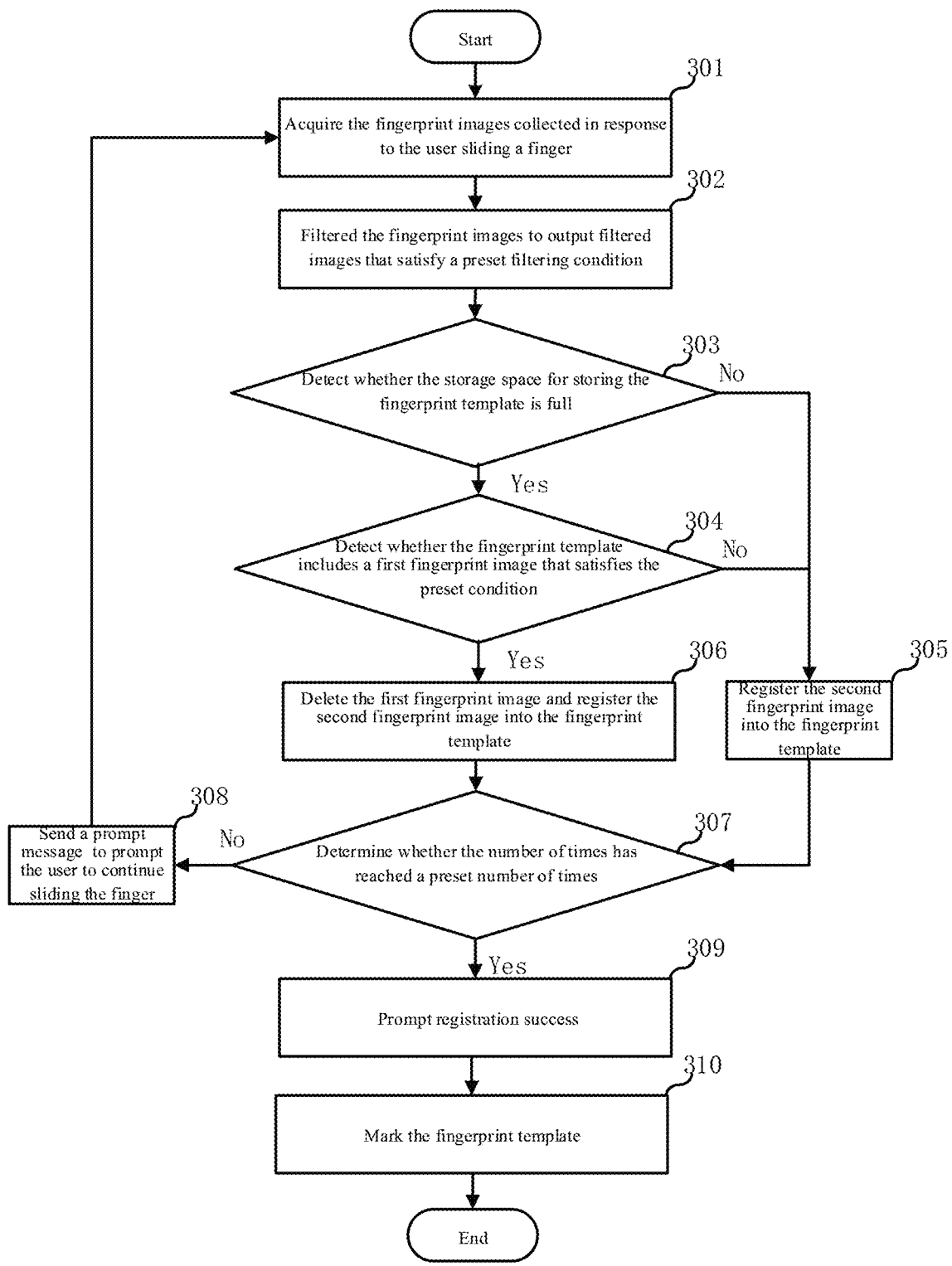
FIG. 5 is a flowchart of a method for registering a fingerprint according to a third embodiment of the present disclosure.

A third embodiment of the present disclosure relates to a method for registering a fingerprint. In this embodiment, before detecting whether the fingerprint template includes a first fingerprint image that satisfies a preset condition, the method further includes: detecting whether a storage space for storing the fingerprint template is full. The method for registering a fingerprint in this embodiment is shown in FIG. 5 and includes the following steps:

In step 301, the fingerprint images collected in response to the user sliding a finger are acquired.

In step 302, the fingerprint images collected are filtered to select filtered images that satisfy a preset filtering condition.

Steps 301 to 302 are substantially the same with steps 201 to 202 in the second embodiment. To avoid repetitions, details are not described herein again.

In step 303, whether the storage space for storing the fingerprint template is full is detected. If yes, step 304 is performed, otherwise step 305 is performed.

Specifically, the storage space for storing fingerprint template may be preset by those skilled in the art according to actual needs. For example, the storage space may be set to be full if 30 frames of fingerprint images are registered into the fingerprint template. However, this embodiment only takes that the storage space may store 30 frames of fingerprint images as an example, which does not constitute a limitation in practical applications. If the storage space for storing the fingerprint template is detected to be full, step 304 is performed, otherwise step 305 is performed.

In step 304, whether the fingerprint template includes a first fingerprint image that satisfies the preset condition is detected. If yes, step 306 is performed, otherwise step 305 is performed.

Specifically, step 304 is substantially the same with step 203 in the second embodiment. To avoid repetitions, details are not described herein again.

Further, in this embodiment, after step 303 is performed, an invalid fingerprint image is deleted and the second fingerprint image is registered into the fingerprint template if the storage space is determined to be full and the fingerprint template does not include a first fingerprint image that satisfies the preset condition, where the invalid fingerprint image is a fingerprint image with the least valid fingerprint information among the registered fingerprint images in the fingerprint template. In other words, if the fingerprint template does not include a fingerprint image that has an overlarge overlap area with the fingerprint image to be registered and the storage space is full at this time, the fingerprint image that has the least valid information to restore the user's fingerprint and that is among the fingerprint images registered into the fingerprint template may be removed in order to provide the storage space for newly collected fingerprint images. The valid information may be understood as the information provided to form the fingerprint image of the user. For example, the fingerprint image with the least valid information may be understood as the fingerprint image which has the least extracted texture detail features when the texture detail features of each registered fingerprint image are extracted.

In step 305, the second fingerprint image is registered into the fingerprint template.

In step 306, the first fingerprint image is deleted and the second fingerprint image is registered into the fingerprint template.

In step 307, whether the number of times has reached a preset number of times is determined. If yes, step 309 is performed, otherwise step 308 is performed.

In step 308, a prompt message is sent to prompt the user to continue sliding the finger.

In step 309, a registration success is prompted.

In step 310, the fingerprint template is marked.

Steps 305 to 310 are substantially the same with steps 204 to 209 in the second embodiment, respectively. To avoid repetitions, details are not described herein again.

Compared with existing technologies, the fingerprint image registered into the fingerprint template is started to be dynamically adjusted if the storage space for storing the fingerprint template is full in this embodiment, which is helpful to improving the validity of dynamic adjustment, so that better fingerprint images may be registered into the fingerprint template through dynamic adjustment even if the storage space is full.

Figure 6:
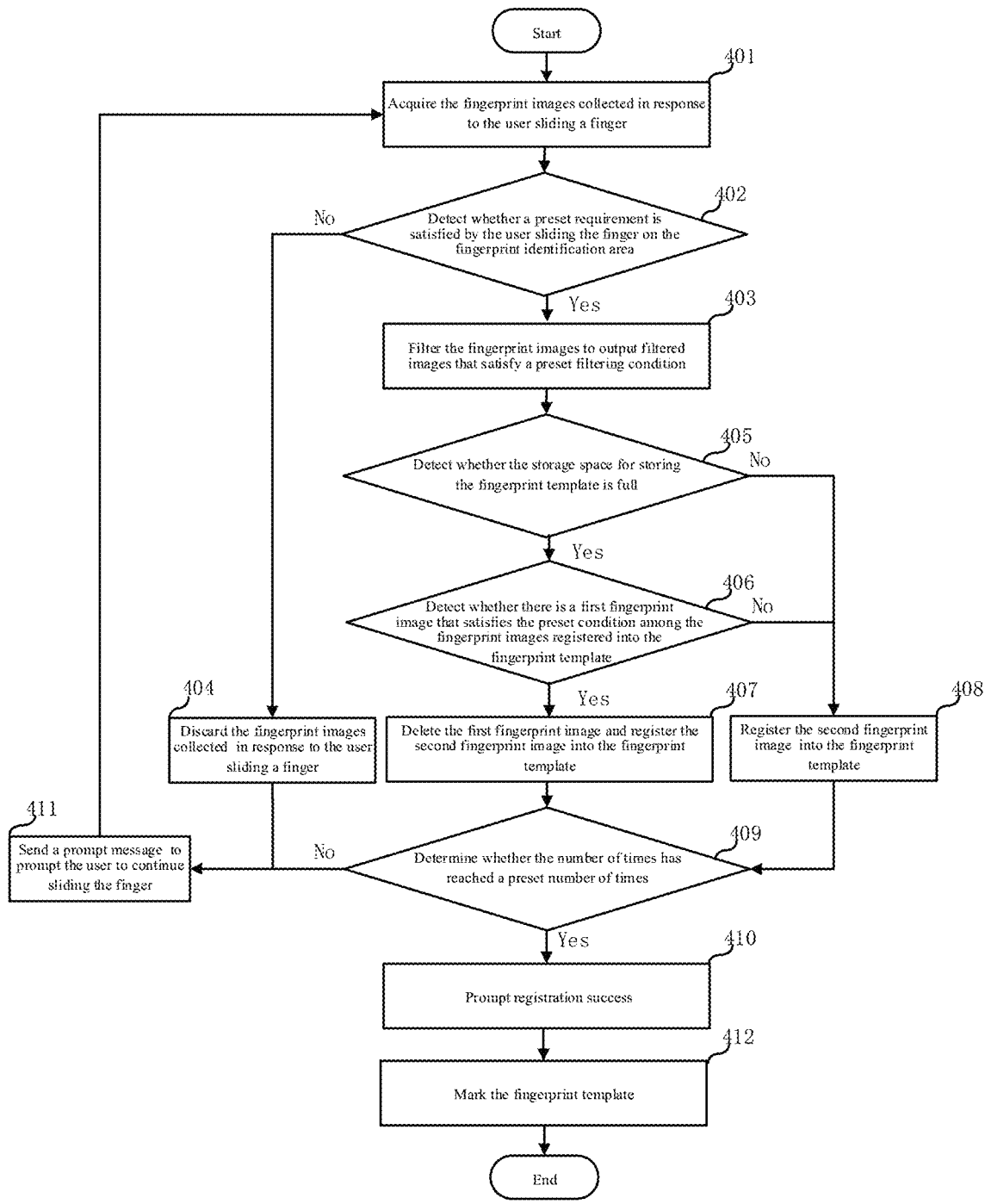
FIG. 6 is a flowchart of a method for registering a fingerprint according to a fourth embodiment of the present disclosure.

A fourth embodiment of the present disclosure relates to a method for registering a fingerprint. In this embodiment, before filtering the fingerprint images to output filtered images that satisfy the preset filtering condition, the method further includes: determining whether a preset requirement is satisfied by the user sliding the finger over the fingerprint identification area, and filtering the fingerprint images to output filtered images that satisfy the preset filtering condition in response to the preset requirement being satisfied. The method for registering a fingerprint in this embodiment is shown in FIG. 6, and includes the following steps:

In step 401, fingerprint images collected in response to the user sliding a finger are acquired.

Step 401 is substantially the same with step 301 in the third embodiment. To avoid repetitions, details are not described herein again.

In step 402, whether a preset requirement is satisfied by the user sliding the finger over the fingerprint identification area is determined. If yes, step 403 is performed, otherwise step 404 is performed.

Figure 7:
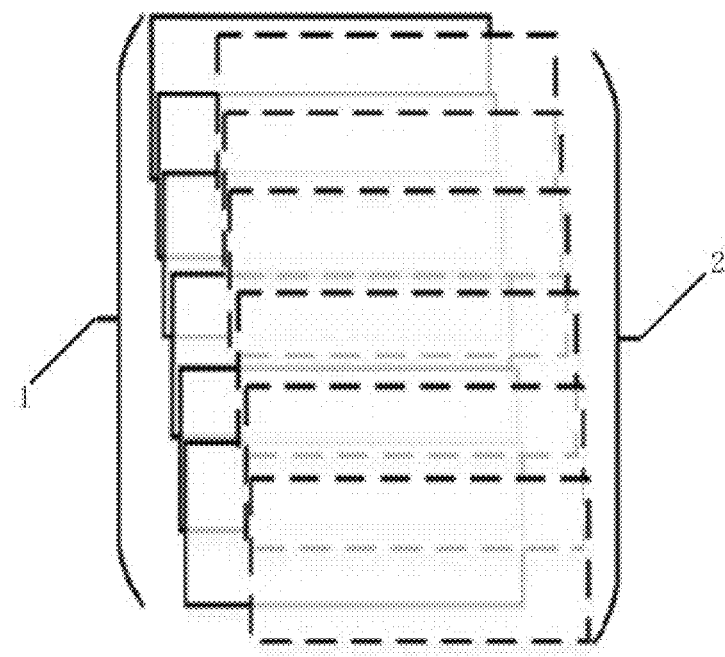
FIG. 7 is a schematic diagram of an overlap area of a sliding area of sliding a finger this time and a sliding area of sliding a finger last time in the method for registering a fingerprint according to the fourth embodiment of the present disclosure.

Specifically, the preset requirement may include: an overlap area of an area across which sliding of the finger is performed at a first time and an area across which sliding of the finger is performed at a second time prior to the first time is smaller than a preset area, where the preset area may be set by those skilled in the art according to actual needs. For facilitating understanding, take FIG. 7 as an example. The dashed frame is the area 2 across which sliding of the finger is performed at a first time and the solid frame is the area 1 across which sliding of the finger is performed at a second time prior to the first time. From FIG. 7, it can be seen that the overlap area between the area 2 and the area 1 is too large. The user sliding the finger over the fingerprint identification area may be considered to not satisfy the preset requirement. If the preset requirement is not satisfied, that is, the user sliding the finger over the fingerprint identification area is invalid, step 404 is performed, or if the preset requirement is satisfied, that is, the user sliding the finger over the fingerprint identification area is valid, step 403 is performed.

In step 403, the fingerprint images are filtered to output filtered images that satisfy a preset filtering condition.

Step 403 is substantially the same with step 302 in the third embodiment. To avoid repetitions, details are not described herein again.

In step 404, the fingerprint images are discarded.

Specifically, since the user sliding the finger over the fingerprint identification area is invalid, that is, there is a large overlap area between the area across which sliding of the finger is performed at a first time and the area across which sliding of the finger is performed at a second time prior to the first time, the fingerprint image obtained at a first time is likely to have too many repetitions with those obtained at a second time prior to the first time. Therefore, the fingerprint images collected at a first time are discarded, that is, the fingerprint images obtained at a first time are not filtered because the user sliding the finger over the fingerprint identification area is invalid. After the step 404 is completed being performed, step 411 may be continued, and a prompt message is sent to prompt the user to continue sliding the finger.

In step 405, whether a storage space for storing the fingerprint template is full is detected. If yes, step 406 is performed, otherwise step 407 is performed.

In step 406, whether the fingerprint template includes a first fingerprint image that satisfies the preset condition is detected. If yes, step 407 is performed, otherwise step 408 is performed.

In step 407, the first fingerprint image is deleted and the second fingerprint image is registered into the fingerprint template.

In step 408, the second fingerprint image is registered into the fingerprint template.

In step 409, whether the number of times has reached a preset number of times is determined. If yes, step 410 is performed, otherwise step 411 is performed.

In step 410, a registration success is prompted.

In step 411, a prompt message is sent to prompt the user to continue sliding the finger.

In step 412, the fingerprint template is marked.

Steps 405 to 412 are substantially the same with steps 303 to 310 in the third embodiment, respectively. To avoid repetitions, details are not described herein again.

Compared with existing technologies, detecting the validity of the user sliding the finger over the fingerprint identification area each time is beneficial to recording the number of times the user slides the finger validly, performing a valid filtering in this embodiment, and discarding fingerprint images collected in response to the user sliding the finger that does not satisfy the preset requirement and also helps to avoid an unnecessary filtering.

A division of the steps of the above methods is only for the sake of clear description. During the implementation, the steps can be combined into one step or some steps can be divided into multiple steps. As long as including the same logical relationship, they are all included within the scope of protection of the present disclosure. Adding insignificant modifications to the algorithm or process or introducing insignificant designs, but not changing the core design of the algorithm and process are within the scope of the present disclosure.

Figure 8:
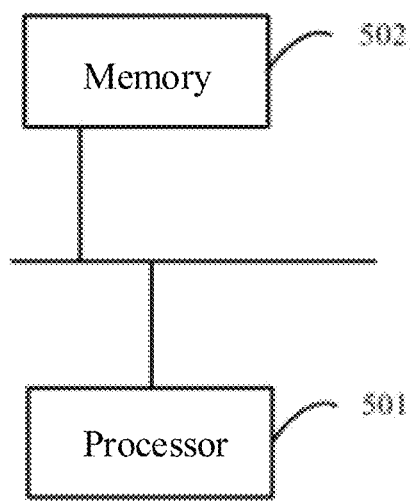
FIG. 8 is a structural schematic diagram of a terminal according to a fifth embodiment of the present disclosure.

A fifth embodiment of the present disclosure relates to a terminal. As shown in FIG. 8, the terminal includes at least one processor 501, and a memory 502 connected and in communication with the at least one processor 501, where the memory 502 stores instructions executable by the at least one processor 501, and the instructions, when executed by the at least one processor 501, cause the at least one processor 501 to perform the method for registering a fingerprint described above.

The memory 502 and the processor 501 are connected by a bus. The bus may include any number of interconnected buses and bridges. The bus connects various circuits of the memory 502 and the one or more processors 501 together. The bus may also connect various other circuits such as peripherals, voltage regulators, and power management circuits, which are well known in the art. Therefore, they are not described further herein. The bus interface provides an interface between the bus and a transceiver. The transceiver may be a single element or multiple elements, such as multiple receivers and transmitters, providing a unit for communicating with various other devices over a transmission medium. The data processed by the processor 501 is transmitted on a wireless medium through an antenna. Further, the antenna also receives the data and transmits the data to the processor 501.

The processor 501 is responsible for managing the bus and general processing, and may also provide various functions, including timing, peripheral interfaces, voltage regulation, power management, and other control functions. The memory 502 may be used to store data used by the processor to perform operations.

A sixth embodiment of the present invention relates to a non-transitory computer-readable storage medium storing a computer program. The computer program, when executed by the processor, causes the processor to perform the above method embodiments.

That is, those skilled in the art may understand that all or some steps that realize the above-described embodiments may be performed by instructing related hardware through a program which may be stored in a computer readable storage medium and which includes several instructions to enable a device (which may be a single-chip microcomputer, a chip, or the like) or a processor to perform all or part of the steps of the method described in each embodiment of the present disclosure. The aforementioned storage media include: a U disk, a mobile hard disk, a read-only memory (ROM), a random access memory (RAM), a magnetic disk or an optical disk and other medium that may store program codes.

Those skilled in the art should appreciate that the aforementioned embodiments are specific examples for implementing the present disclosure. In practice, however, many changes can be made in forms and details of the specific embodiments without departing from the spirit and the scope of the invention.

What is claimed is:

1. A terminal, comprising:
at least one processor; and
a memory connected and in communication with the at least one processor; wherein,
the memory stores instructions executable by the at least one processor, and the instructions when executed by the at least one processor causing the at least one processor to perform a method for registering a fingerprint, the method comprising:
acquiring fingerprint images collected in response to a user sliding a finger over a fingerprint identification area of the mobile terminal; wherein the fingerprint images include a number of sets of images corresponding, respectively, to the user sliding the finger over the fingerprint identification area a number of times, each set of images being collected in response to the user sliding the finger once over the fingerprint identification area;

filtering the fingerprint images to select filtered images that satisfy a preset filtering condition, including:
   filtering each set of images after the each set of images is collected to select a corresponding set of filtered images that satisfy the preset filtering condition; and registering the filtered images into a fingerprint template of the mobile terminal, including:
   registering each corresponding set of filtered images into the fingerprint template;

wherein registering the filtered images into the fingerprint template comprises:

detecting whether a storage space for storing the fingerprint template is full;

detecting whether the fingerprint template includes a first fingerprint image that satisfies a preset condition in response to the storage space being full;

deleting the first fingerprint image and registering a second fingerprint image into the fingerprint template in response to the fingerprint template including the first fingerprint image that satisfies the preset condition, wherein the second fingerprint image is one of the filtered images that satisfies the preset filtering condition; and deleting an invalid fingerprint image and registering the second fingerprint image into the fingerprint template in response to the storage space being full and the fingerprint template not including a fingerprint image that satisfies the preset condition, wherein the invalid fingerprint image is a fingerprint image with the least valid fingerprint information among registered fingerprint images in the fingerprint template.

2. The terminal according to claim 1, further comprising, after registering the fingerprint images into the fingerprint template:
   determining whether the number of times has reached a preset number of times; and
   sending a prompt message to prompt the user to continue sliding the finger if the preset number of times is not reached.

3. The terminal according to claim 2, wherein the prompt message comprises at least: a first area across which the user should slide the finger again, wherein the first area is different from a second area across which the user slid the finger previously.

4. The terminal according to claim 1, the method further comprising, before filtering the fingerprint images to select filtered images that satisfy the preset filtering condition:
   determining whether a preset requirement is satisfied by the user sliding the finger over the fingerprint identification area, wherein the preset requirement comprises:
   an overlap area of an area across which sliding of the finger is performed at a first time and an area across which sliding of the finger is performed at a second time prior to the first time is smaller than a preset area;
   filtering the fingerprint images to select filtered images that satisfy the preset filtering condition in response to the preset requirement being satisfied; and
   discarding the fingerprint images in response to the preset requirement not being satisfied.

5. The terminal according to claim 1, wherein the preset condition comprises:
   an overlap area of the first fingerprint image and the second fingerprint image is larger than a preset threshold value and an image quality of the second fingerprint image exceeds that of the first fingerprint image.

6. The terminal according to claim 1, wherein the filtering the fingerprint image comprises:
   determining an image quality and an image area of a fingerprint image of a current frame;
   calculating an overlap rate of the fingerprint image of the current frame and a fingerprint image of a previous frame if the image quality of the fingerprint image of the current frame satisfies a preset quality standard and the image area of the fingerprint image of the current frame satisfies a preset area standard; and
   taking the fingerprint image of the current frame as a fingerprint image that satisfies the preset filtering condition if the overlap rate is less than a preset threshold overlap rate value.

7. The terminal according to claim 1, the method further comprising, after registering the filtered images:
   marking the fingerprint template.

8. A non-transitory computer-readable storage medium storing therein a computer program, wherein the computer program when executed by a processor causes the processor to perform a method for registering a fingerprint, the method comprising:
   acquiring fingerprint images collected in response to a user sliding a finger over a fingerprint identification area of the mobile terminal; wherein the fingerprint images include a number of sets of images corresponding, respectively, to the user sliding the finger over the fingerprint identification area a number of times, each set of images being collected in response to the user sliding the finger once over the fingerprint identification area;

filtering the fingerprint images to select filtered images that satisfy a preset filtering condition, including:
      filtering each set of images after the each set of images is collected to select a corresponding set of filtered images that satisfy the preset filtering condition; and registering the filtered images into a fingerprint template of the mobile terminal, including:
      registering each corresponding set of filtered images into the fingerprint template;

wherein registering the filtered images into the fingerprint template comprises:

detecting whether a storage space for storing the fingerprint template is full;

detecting whether the fingerprint template includes a first fingerprint image that satisfies a preset condition in response to the storage space being full;

deleting the first fingerprint image and registering a second fingerprint image into the fingerprint template in response to the fingerprint template including the first fingerprint image that satisfies the preset condition, wherein the second fingerprint image is one of the filtered images that satisfies the preset filtering condition; and deleting an invalid fingerprint image and registering the second fingerprint image into the fingerprint template in response to the storage space being full and the fingerprint template not including a fingerprint image that satisfies the preset condition, wherein the invalid fingerprint image is a fingerprint image with the least valid fingerprint information among registered fingerprint images in the fingerprint template.

9. The terminal according to claim 1, wherein the fingerprint samples collected in the subsequent fingerprint identification process include a fingerprint collected by the user pressing the finger.

10. The terminal according to claim 9, the method further comprising replacing a filtered image registered into the fingerprint template with the fingerprint collected by the user pressing the finger in response to the fingerprint collected by the user pressing the finger successfully matching the filtered image registered into the fingerprint template.

* * * * *